Aug. 26, 1969  W. R. BRIGGS ET AL  3,463,206
TOOTH BIT FOR INSERTED TOOTH SAWS
Filed May 17, 1967
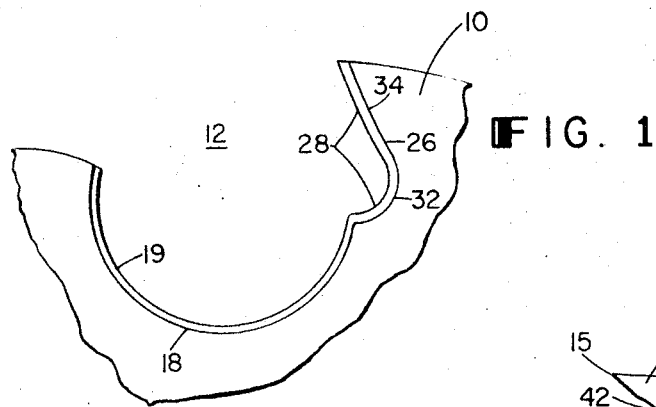
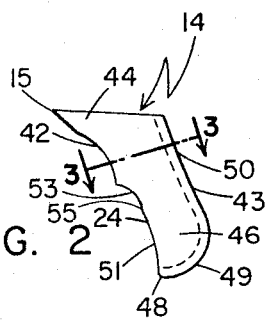
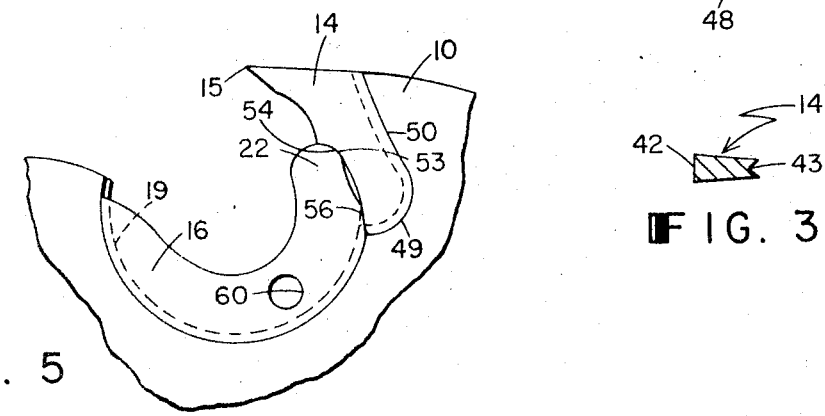
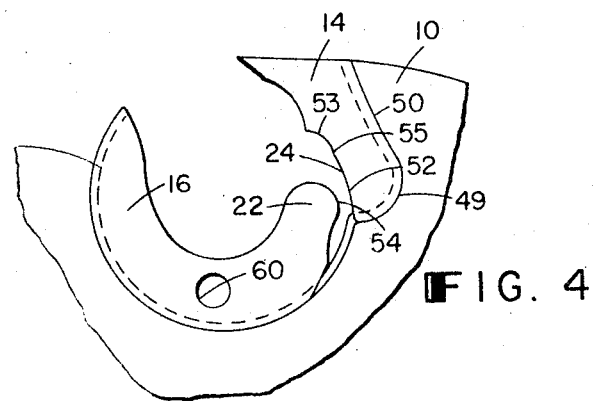

United States Patent Office 3,463,206
Patented Aug. 26, 1969

3,463,206
TOOTH BIT FOR INSERTED TOOTH SAWS
William R. Briggs, Leominster, and Armas O. Haimila, Fitchburg, Mass., assignors to Wallace-Murray Corporation, Fitchburg, Mass., a corporation of Delaware
Filed May 17, 1967, Ser. No. 639,158
Int. Cl. B27b 33/12
U.S. Cl. 143—151    2 Claims

ABSTRACT OF THE DISCLOSURE

The rear wall of a tooth bit insert for a saw and the saw recess for the tooth bit are given novel reverse curvature configurations permitting their interface, for steady holding power, to be matchingly V-grooved and recessed throughout its length, yet holding the bit, when preseated in the recess, against rising out of the recess while a shank is being rotated in front of the bit into bit locking position. The reverse curvature configuration provides a narrowest front-to-back bit dimension in the middle section of the bit which, after rotation of the shank into locking position, is wedged against the saw plate by shank surfaces which bear against the front wall of the bit both above and below this narrowest bit dimension, thereby providing high resistance to seat-separating forces.

---

This invention relates to inserted tooth saws and more particularly to a matching configuration of bits and shanks therefor, looking towards longer operating life before resharpening the cutting edges, due to better bit holding power and hence increased rigidity resisting deflection and misalignment of the cutting edges and minimizing development of looseness as a result of vibration under hammering or overloading conditions.

Among the more recent developments in inserted tooth construction are bit and shank configurations which permit assembly of the bits in their sockets by first seating the bit and then rotating a cooperating shank rearwardly towards and into locking engagement with the preseated bit. This mode of assembly was contrasted with earlier practice where both the bit seat and the shank seat were so formed, on arcs of circles or otherwise, that the bit and shank could be rotated together downwardly and forwardly, in the same direction of rotation, into their seats. The preseating of the bit provided certain advantages over the earlier practice, as described in column 4 of U.S. Patent No. 2,934,105 to Ferguson.

In these latter saws, however, it was necessary, in order to prevent the shank, as it moved into locking engagement with the bit, from unseating the preseated bit. In the above Ferguson patent, this was accomplished by terminating the normal V-groove formed in the back wall of the bit and the cooperating V-rib in the saw plate bit seat, above their lower ends so as to form an inwardly extending shoulder or abutment which would prevent upward motion of the bit while it was in its seat during the final shank locking motion. The elimination of the V-interlock between the bit and saw plate for a short distance at the bottom end of the bit was regarded as being of little consequence.

It has since, however, been realized that if another way of holding a preseated bit in its seat during the shank locking operation could be found, restoration of the V-interlock throughout the entire bit seating interface might afford sufficient additional rigidity to be of marked consequence when retained along with other features that could also be incorporated into such a changed construction.

The present invention is thus directed to a bit seat construction which, for the first time, preserves the advantages of both (a) preseating of the bit and (b) 100% V-interlock throughout the entire length of the bit and bit seat interface.

To accomplish this object, the time-honored concave saw plate bit seat is discarded. On reflection, one can see that its retention has indeed outlived its essentialness, since it was born of the requirement for bit rotary movement during bit insertion made concurrently and in the same rotary direction with shank rotation. With the advent of preseating of the bit, its essentialness became illusory.

In accordance with this invention, there is provided a saw plate bit seat which, in an intermediate section, is convex to match a corresponding slight concavity in the back wall configuration of the bit. The presence of these complementing curvatures interferes in no way with the continuity of the matching V-groove and V-rib construction throughout the length of both wall surfaces, but offers sufficient resistance to prevent unseating of the preseated bit in a rising direction during any unseating forces exerted on the preseated bit during rearward rotation of the shank into bit locking position. Any upward motion of the bit causes increased locking pressure.

This configuration permits the angle at the junction of the bit seat with the periphery of the saw plate to be much less sharp, thus strengthening the leading edge of the saw plate shoulder. Moreover, the shank may have a configuration providing a double bearing.

A typical embodiment of the invention is shown in the accompanying drawings wherein:

FIG. 1 is a side elevation of a portion of a saw plate showing one of the sockets before insertion of either the bit or the shank;

FIG. 2 is a side elevational view of a bit contoured in accordance with the invention;

FIG. 3 is a cross-sectional view taken on line 3—3 of FIG. 2;

FIG. 4 is a view similar to FIG. 1 with the bit preseated and the shank ready to be rotated into engagement therewith; and FIG. 5 is a similar view of the completely assembled inserts.

In the drawings, the saw body or plate is indicated at 10 as presenting a series of sockets 12 each adapted to receive a pair of inserts, one of which is a bit 14 having a head carrying a cutter tip 15 and the other a shank 16.

The sockets 12 are provided at their bottoms with shank receiving circular walls 18 which have a rib 19, as shown in FIG. 1 for engaging the elongated grooved shank 16 in a conventional manner, the rear end 22 of the shank having a contour to engage the forward wall 24 of the bit 14. The circular wall 18, as shown in FIG. 1 merges rearwardly into a complexly curved forwardly facing saw plate wall 26 which is also ribbed at 28 throughout its length to form a ribbed bit seat. It will be noted that the rib 28 extends down from the periphery of the saw body all the way to the shank-engaging wall 18, with the bottom of the ribbed bit seat having the usual concavely curved wall 32 but as it progresses upwardly it passes through a reverse curvature at 34 to provide a convexity.

The bit 14, as shown in FIGS. 2 and 3, has a forward wall 42 and a rear grooved wall 43, the groove extending all the way from the head 44 of the bit to the bottom of the leg 46 of the bit, meeting the forward wal 42 at junction 48. The configuration of the rear bit wall, in elevation, matches the configuration of the saw plate seat with the result that the rear surface of the bit 14, from the junction 48 curves convexly upwardly at 49 and then merges into a slightly concave contour at 50.

The forward wall 42 of bit 14 also has a shank bearing surface 51 against which, by rotation of the shank counterclockwise as shown in the drawings, the preseated bit 14 is locked against the reverse curvature to prevent the bit from rising despite relative motion between the shank and the bit. The surface 51 is a composite of a lower arcuate section 52 merging at its top into a recess 53 of less radius to accommodate the bulbous end surface 54 of shank 16 allowing the crescent shank to expand into the recess 53 after it passes under high compression over lobe 55. The shank and bit geometry is such that as 54 seats in recess 53, a compression bearing between shank 16 and bit 14 is also establish at 56 having greater pressure because of the smaller leverage. The double bearing provided by spaced surfaces 54 and 56 bearing against bit 14 both above and below the narrowest front-to-back wall dimension of the bit thus gives increased holding capacity to the bit. In the final locked position the downwardly slightly diverging rear and front walls of the bottom portions of the bit leg form an enlargement which is securely wedged between the opposed rear wall of the shank and forward wall of the bit seat which conversely converge slightly upwardly, thereby gaining the benefit not only of a rearward force exerted by the tensioned shank, but also a downward component of resistance to any rise of the wedged-in lower portion of the bit leg. This combination has a shock absorbing feature in that displacement creates continually increasing resistance and at the same time bypassing the possible damage of overloading a rigid lock.

The reference numeral 60 of the drawings indicates the usual aperture for insertion of a part of a shank rotating tool.

Not only is better operation of saws having conventional bit lengths obtained, but it has been found that the construction shown in the drawings permits use of longer bit lengths with longer operating life before resharpening.

What is claimed is:

1. In a circular saw of the inserted tooth class having a peripheral recess for receiving tooth bit and shank inserts, a tooth bit comprising a metal piece having a head with a cutter tip thereon, and a depending leg having opposed side faces and rear and forward transverse walls, said rear wall extending forwardly at the bottom of said leg and meeting the bottom of said forward wall, said rear wall having a lower convexly curving section and a superposed concavely curving section, said rear wall having an aligning groove extending from the head continuously through said concave and convex sections of said rear wall all the way to the junction of said rear and forward wall at the bottom of said leg, said tooth bit having its rear wall seated in said recess against a complementary forwardly-facing bearing wall of said saw, and a crescent-shaped compression shank seated in the bottom of said recess and having spaced rear surfaces bearing against the forward wall of said bit both above and below the junction of said convexly and concavely curving sections of said rear wall.

2. In a circular saw of the inserted tooth class having a peripheral recess for receiving tooth bit and shank inserts, a tooth bit comprising a metal piece having a head with a cutter tip thereon, and a depending leg having opposed side faces and rear and forward transverse walls, said rear wall extending forwardly at the bottom of said leg and meeting the bottom of said forward wall, said rear wall having a lower convexly curving section and a superposed concavely curving section, said rear wall having an aligning groove extending from the head continuously through said concave and convex sections of said rear wall all the way to the junction of said rear and forward wall at the bottom of said leg, said forward and back walls of said leg converge upwardly towards said head in a lower section of the bit and above said lower section diverge upwardly toward said head, said tooth bit having its narrowest forward-to-back wall dimension at the junction between said lower section and said section above said lower section, said bit having its rear wall seated in said saw recess against a complementary forwardly facing bearing wall of said saw, and a crescent-shaped compression shank seated in the bottom of said saw recess and having spaced rear surfaces bearing against the forward wall of said bit both above and below the said narrowest dimension of said bit.

References Cited

UNITED STATES PATENTS

| | | | |
|---|---|---|---|
| 409,271 | 8/1889 | Cardiff | 143—151 |
| 580,950 | 4/1897 | McCoy | 143—151 |
| 1,552,493 | 9/1925 | Miner et al. | 143—151 |
| 1,786,959 | 12/1930 | Orr | 143—141 |

DONALD R. SCHRAN, Primary Examiner

U.S. Cl. X.R.

29—105